(12) United States Patent
Nakamura

(10) Patent No.: US 7,599,114 B2
(45) Date of Patent: Oct. 6, 2009

(54) STEREOMICROSCOPE

(75) Inventor: Masahiro Nakamura, Yokohama (JP)

(73) Assignees: Nikon Vision Co., Ltd., Tokyo (JP); Nikon Corporation, Tokyo (JP)

( * ) Notice: Subject to any disclaimer, the term of this patent is extended or adjusted under 35 U.S.C. 154(b) by 0 days.

(21) Appl. No.: 11/325,423

(22) Filed: Jan. 5, 2006

(65) Prior Publication Data

US 2006/0146401 A1 Jul. 6, 2006

(30) Foreign Application Priority Data

Jan. 6, 2005 (JP) .............................. 2005-001672

(51) Int. Cl.
*G02B 21/00* (2006.01)

(52) U.S. Cl. ...................................... 359/384; 359/377

(58) Field of Classification Search .................. 359/384, 359/382

See application file for complete search history.

(56) References Cited

U.S. PATENT DOCUMENTS

| | | | | |
|---|---|---|---|---|
| 2,604,815 A | * | 7/1952 | Engelmann | ...................... 108/1 |
| 4,605,287 A | * | 8/1986 | Lang et al. | .................... 359/374 |
| 4,856,873 A | * | 8/1989 | Kleinberg | .................... 359/363 |
| 5,052,789 A | * | 10/1991 | Kleinberg | .................... 359/375 |
| 5,835,266 A | | 11/1998 | Kitajima | |
| 5,841,576 A | * | 11/1998 | Aikawa | ........................ 359/383 |
| 6,441,958 B1 | * | 8/2002 | Yeung et al. | ................. 359/372 |
| 6,473,229 B2 | * | 10/2002 | Nakamura | .................... 359/377 |
| 7,002,738 B2 | * | 2/2006 | Sturgis et al. | ................ 359/384 |
| 2002/0183663 A1 | * | 12/2002 | Lu et al. | ........................ 601/28 |
| 2004/0091259 A1 | * | 5/2004 | Hanzawa | ..................... 396/534 |
| 2006/0077535 A1 | | 4/2006 | Luther et al. | |

FOREIGN PATENT DOCUMENTS

| | | |
|---|---|---|
| CN | 1121181 A | 4/1996 |
| JP | 63167318 A  * | 7/1988 |
| JP | 4-159508 A | 6/1992 |
| JP | 8-005931 | 1/1996 |
| JP | 2002-267938 | 9/2002 |
| WO | WO 2004/023185 A1 | 3/2004 |

* cited by examiner

*Primary Examiner*—Lee Fineman
(74) *Attorney, Agent, or Firm*—Miles & Stockbridge P.C.

(57) ABSTRACT

Providing a compact lightweight stereomicroscope securing a light weight necessary for carrying, capable of securing stability upon attaching a camera. The stereomicroscope includes a base 1 that places a sample thereon, a microscope body 9 having a pair of left and right observation optical systems for observing the sample and a photographing optical system that leads the light from the sample substantially corresponding to the focusing center of the observation optical systems to a imaging means 17, a column 3 that is disposed on the base 1 and supports the microscope body 9, a support means that supports the imaging means 17, and a connecting means 13 that rotatably connects the microscope body 9 to the column 3. An optical axis I of the photographing optical system becomes substantially parallel to a rotation axis O of the connecting means.

9 Claims, 8 Drawing Sheets

FIG. 7A
FIG. 7B
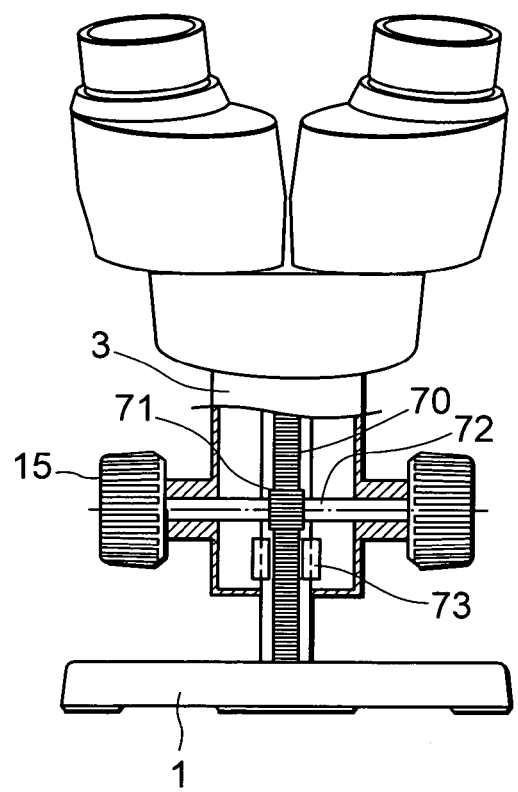
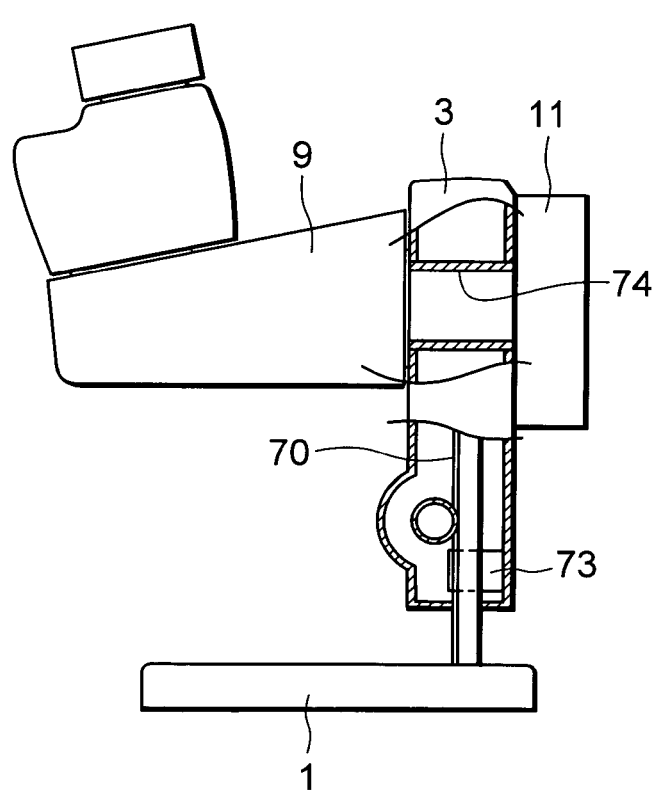

STEREOMICROSCOPE

This application claims the benefit of Japanese Patent application No. 2005-001672 filed on Jan. 6, 2005 which is hereby incorporated by reference.

BACKGROUND OF THE INVENTION

1. Field of the Invention

The present invention relates to a stereomicroscope and in particular to a compact lightweight stereomicroscope suitable for observing and photographing an object with being carried outdoors.

2. Related Background Art

A compact lightweight stereomicroscope for magnifying and observing an object outdoors has been proposed, for example, in Japanese Patent Application Laid-Open No. 8-005931. The compact lightweight stereomicroscope makes it possible to be folded compact by turning an eyepiece tube member to face the eyepiece portion toward a stage upon being carried outdoors.

In photographing an object with an ordinary stereomicroscope, a so-called trinocular eyepiece tube is used, in which an optical path is divided by a beam splitter arranged in the optical path between objective lenses and eyepieces, and a camera is arranged on the divided optical path for a photographing optical system to take picture of the object. In this case, in order to secure stability upon equipping a camera, the weight of the base portion thereof is designed to be sufficiently heavy (see, for example, Japanese Patent Application Laid-Open No. 2002-267938).

Recently, a portable compact light weight stereomicroscope has been desired to be able to photograph as well as to observe an object. However, when a conventional photographing optical system using a trinocular eyepiece tube is used, since the tube portion for photographing is remained at all times even if photographing does not take place (while, for example, carrying or storing), the weight of the stereomicroscope increases, so that light weight for portability is spoiled. Moreover, when photographing takes place, since a camera for photographing has to be put on upper part of the microscope (in the vicinity of the upper part of the eyepiece tube), the center of gravity becomes high, so that it becomes easy to tumble. Furthermore, in a compact lightweight stereomicroscope, it is possible to observe an object by rotating a tube portion by substantially 90 degrees being in a state of horizontal position. However, when a camera is attached to the trinocular eyepiece tube, since the center of gravity varies in the horizontal direction, so that the stereomicroscope becomes easy to tumble.

In this manner, when a photographing optical system of a conventional trinocular eyepiece tube is applied to a compact lightweight stereomicroscope, light weight for portability and stability upon attaching a camera tend to be spoiled.

SUMMARY OF THE INVENTION

The present invention has been made in view of the above-described situations. An object of the present invention is to provide a compact lightweight stereomicroscope capable of keeping light weight necessary for portability and securing stability upon attaching a camera.

According to a first aspect of the present invention, there is provided a stereomicroscope including an eyepiece portion, a base, a column that is vertically disposed from the base, a microscope body that is disposed on an observer side with respect to the column, has a rotation axis substantially perpendicularly to the column, and is capable of being rotated around the rotation axis, and a support means that supports an imaging means and is disposed on the other side of the microscope body with respect to the column, that is, with the column being located in between the support means and the microscope body.

In the first aspect of the present invention, it is preferable that the microscope body includes an optical axis of the imaging optical system that leads light from a sample to the imaging means and an optical axis of an optical system which is substantially coaxial with the rotation axis.

In the first aspect of the present invention, it is preferable that the optical axis of the imaging optical system which is substantially coaxial with the rotation axis is substantially coaxial with an optical axis of the imaging means.

In the first aspect of the present invention, it is preferable that the microscope body includes a photographing optical system which leads the light from the sample to the imaging means, and the photographing optical system includes a reflection member which reflects the light from the sample substantially perpendicularly to lead to the photographing optical system.

In the first aspect of the present invention, it is preferable that the reflection member is disposed at a position where an optical axis of the light incident on the reflection member becomes perpendicular to a plane of the base.

In the first aspect of the present invention, it is preferable that the microscope body includes an observation optical system that leads the light come out from the sample to the eyepiece portion and the observation optical system has an optical axis which is not coaxial with the optical axis of the light come out from the sample and led to the reflection member.

In the first aspect of the present invention, it is preferable that the observation optical system that leads the light come out from the sample to the eyepiece portion and the photographing optical system that leads the light come out from the sample to the reflection member have respective objective lenses.

In the first aspect of the present invention, it is preferable that the eyepiece portion has a pair of left and right eyepieces and the objective lenses of the observation optical system has also a pair of left and right objective lenses.

In the first aspect of the present invention, it is preferable that the objective lenses included in the observation optical system that leads the light come out from the sample to the eyepiece portion and the objective lens included in the photographing optical system that leads the light come out from the sample to the reflection member are disposed such that radial directions of the respective objective lenses become perpendicular to the respective optical axes.

In the first aspect of the present invention, it is preferable that a focusing center of the observation optical system and that of the photographing optical system are substantially coincide with each other.

In the first aspect of the present invention, it is preferable that an optical path deflection member that leads the light along the photographing optical system to the imaging means held by the support means is included in the column.

In the first aspect of the present invention, it is preferable that the column includes a focusing handle that makes the microscope body move vertically up and down along the column and a driver that drives the microscope up and down by turning the focusing handle, and the support means moves up and down in accordance with the movement of the microscope body by turning the focusing handle.

According to a second aspect of the present invention, there is provided a stereomicroscope including an eyepiece portion, a base, a column that is vertically disposed from the base, a microscope body that is disposed on an observer side with respect to the column, has a rotation axis substantially perpendicularly to the column, and is capable of being rotated around the rotation axis, and a support means that supports an imaging means, is disposed on the same observer side as the microscope body with respect to the column, and is disposed on a position capable of being rotated around the rotation axis in a body with the microscope body.

In the second aspect of the present invention, it is preferable that the microscope body includes an optical axis of the imaging optical system that leads light from a sample to the imaging means and an optical axis of an optical system which is substantially coaxial with the rotation axis.

In the second aspect of the present invention, it is preferable that the optical axis of the imaging optical system which is substantially coaxial with the rotation axis is substantially coaxial with an optical axis of the imaging means.

In the second aspect of the present invention, it is preferable that the microscope body includes a photographing optical system which leads the light from the sample to the imaging means, and the photographing optical system includes a reflection member which reflects light substantially perpendicularly to lead the light from the sample to the photographing optical system.

In the second aspect of the present invention, it is preferable that the reflection member is disposed at a position where an optical axis of the light incident on the reflection member becomes perpendicular to a plane of the base.

In the second aspect of the present invention, it is preferable that the microscope body includes an observation optical system that leads the light come out from the sample to the eyepiece portion and the observation optical system has an optical axis which is not coaxial with the optical axis of the light come out from the sample and led to the reflection member.

In the first aspect or the second aspect of the present invention, it is preferable that the base has a variable space means capable of varying a setting area of the base.

BRIEF DESCRIPTION OF THE DRAWINGS

FIGS. 7A and 7B respectively show a front view and a side view of the stereomicroscope according to the first embodiment of the present invention.

DESCRIPTION OF THE MOST PREFERRED EMBODIMENTS

Embodiments according to the present invention are explained below with reference to accompanying drawings.

Figure 1:
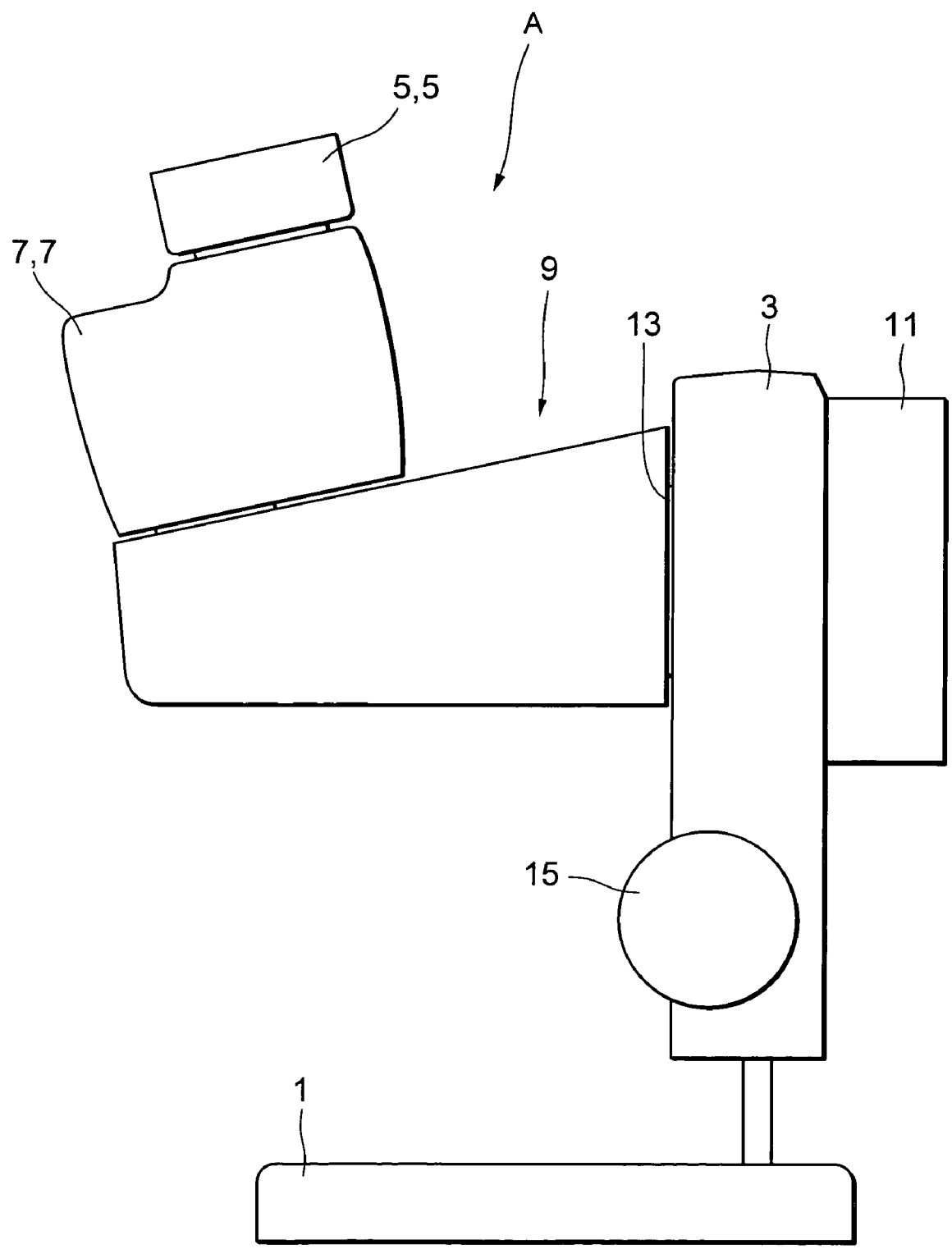
FIG. 1 is a side view showing a stereomicroscope according to a first embodiment of the present invention without attaching a camera.
Figure 2:
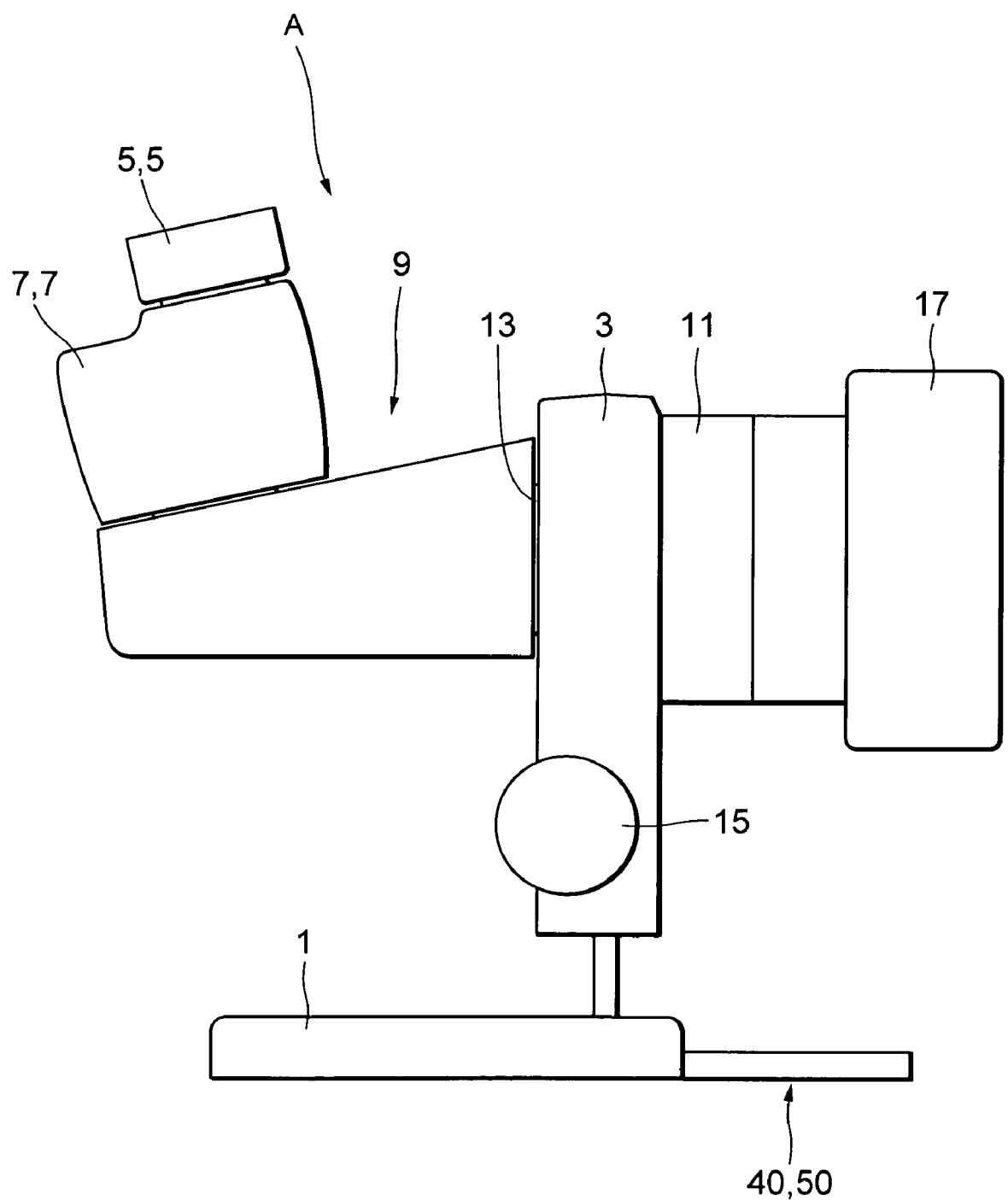
FIG. 2 is a side view showing a stereomicroscope according to the first embodiment of the present invention with attaching a camera.
Figure 3:
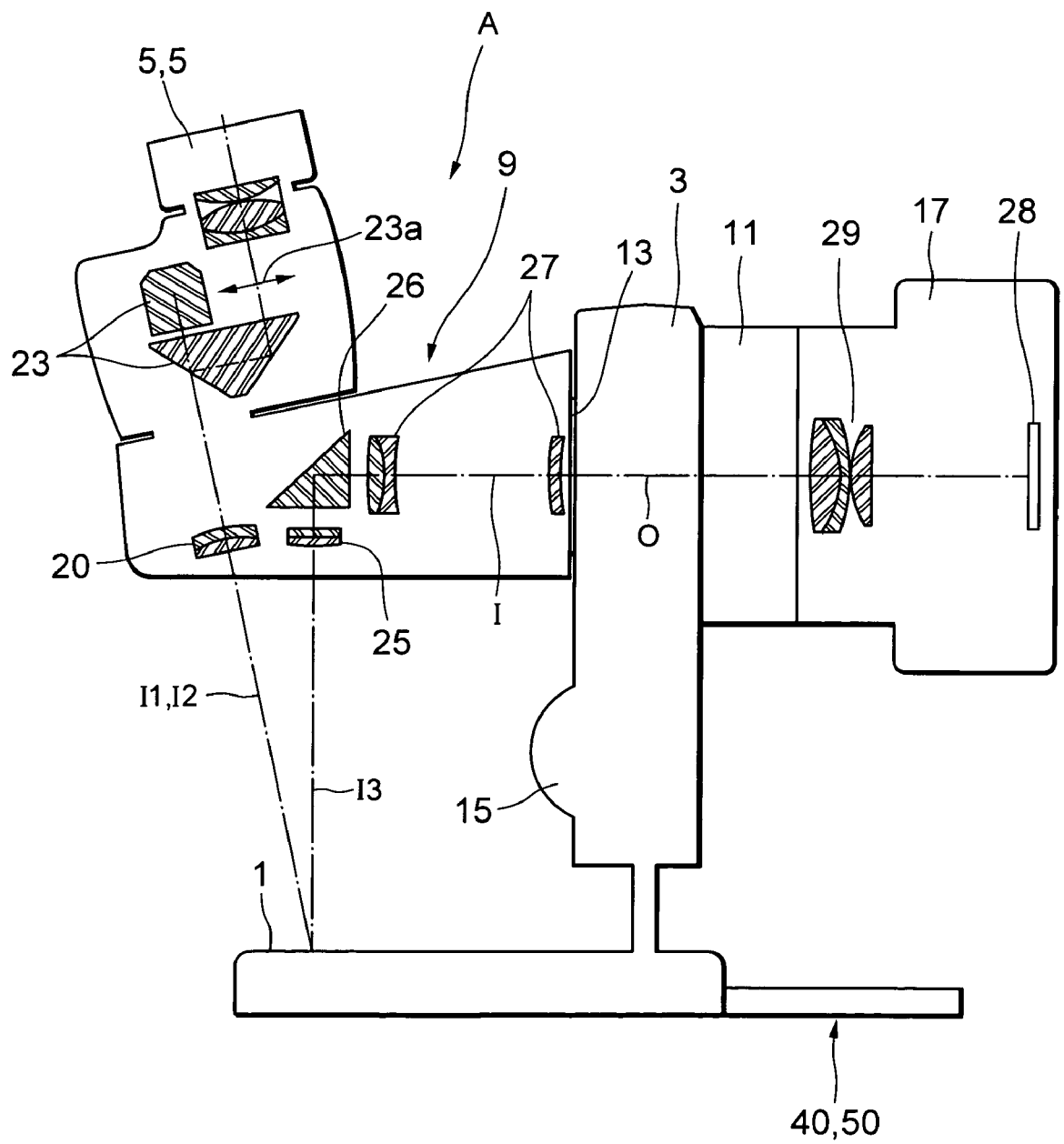
FIG. 3 is a view schematically showing an optical system of the stereomicroscope according to the first embodiment of the present invention.
Figure 4A:
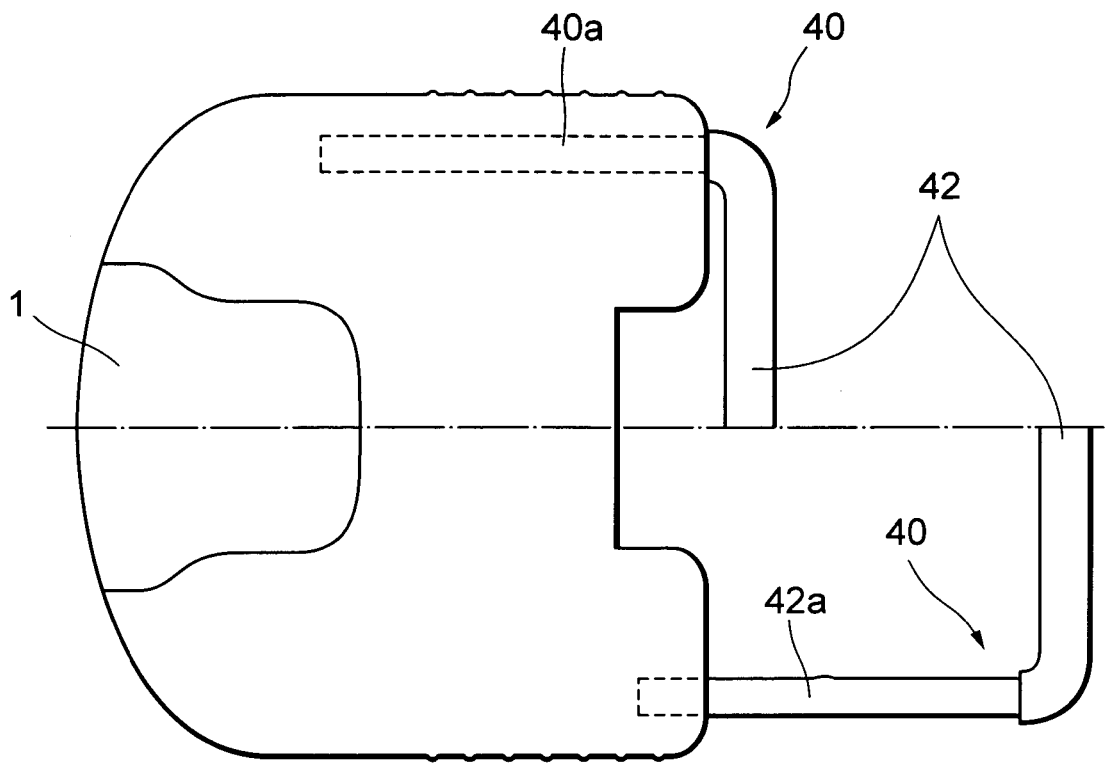
FIGS. 4A and 4B are views schematically showing variable space means equipped on the stereomicroscope according to the first embodiment of the present invention.
Figure 4B:
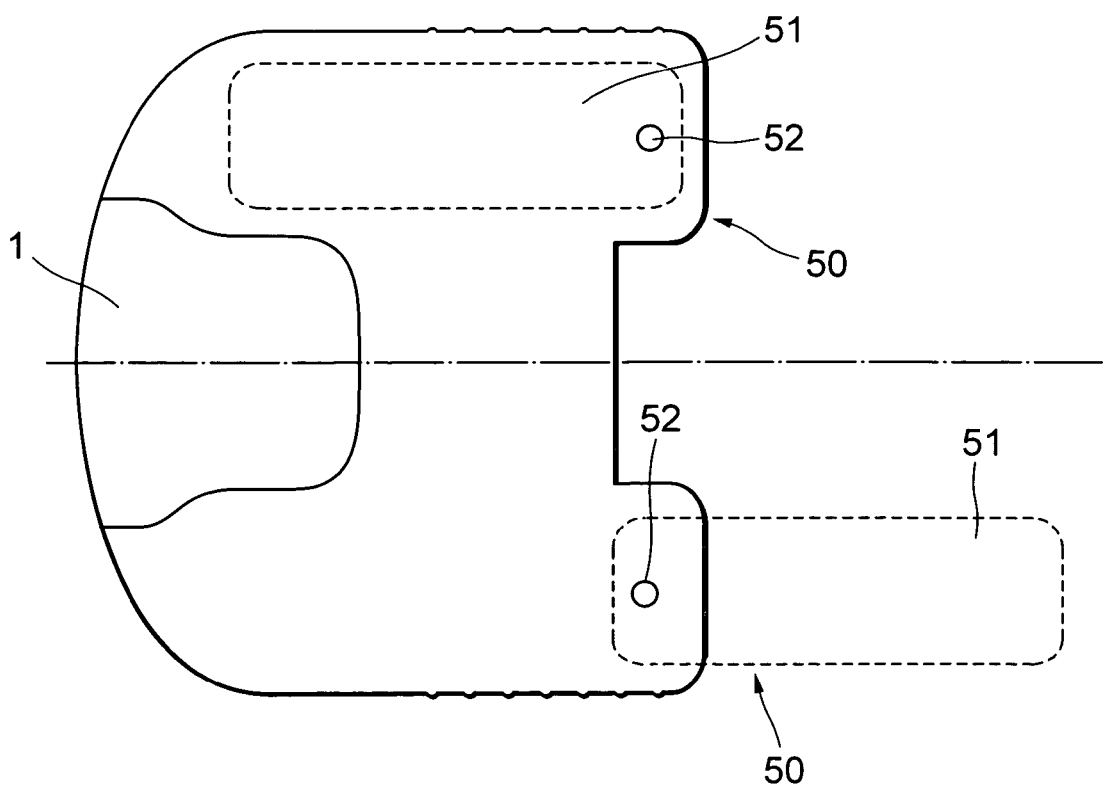
Figure 5:
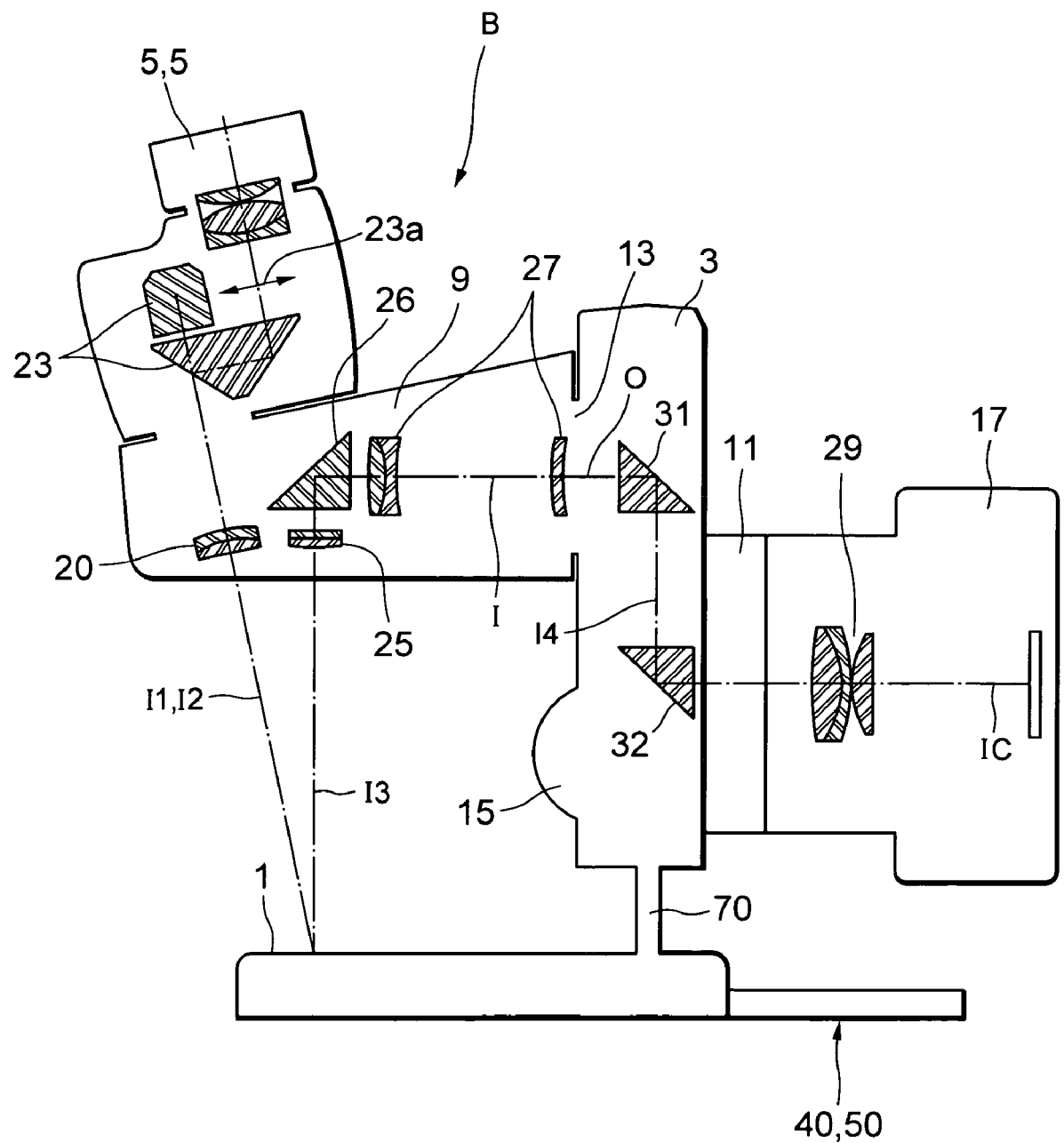
FIG. 5 is a view schematically showing an optical system of the stereomicroscope according to a second embodiment of the present invention.
Figure 6:
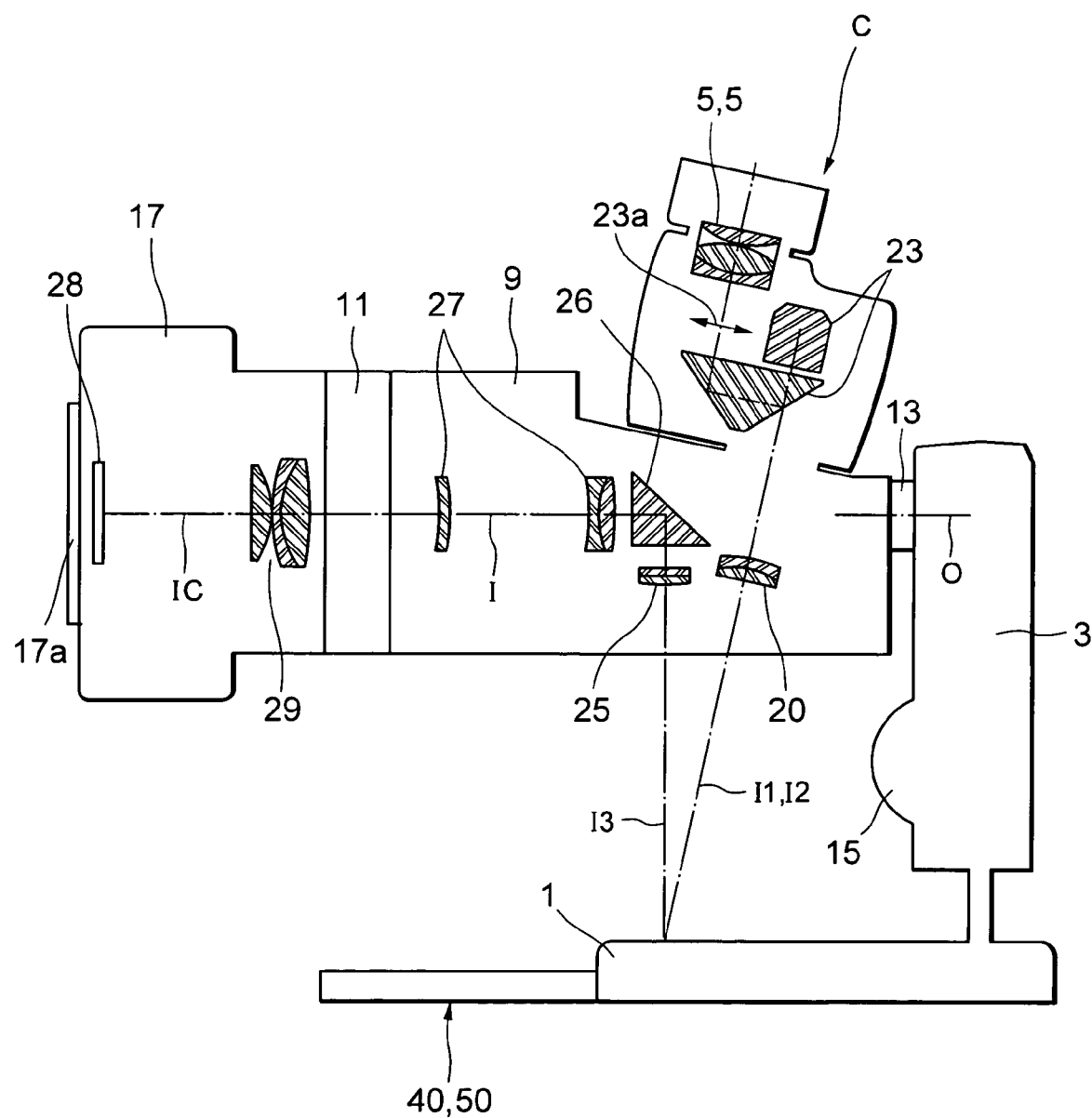
FIG. 6 is a view schematically showing an optical system of the stereomicroscope according to a third embodiment of the present invention.
Figure 8:
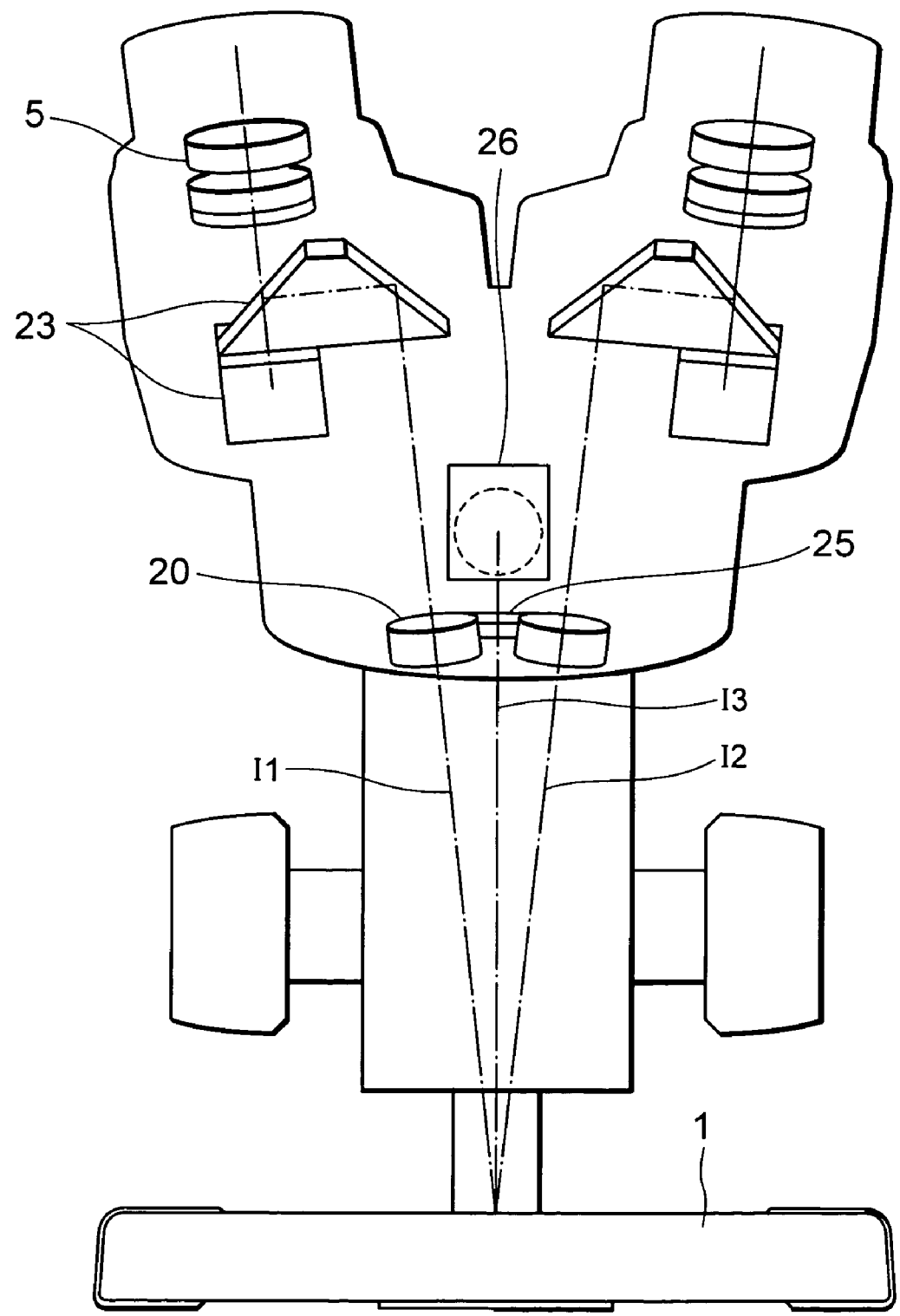
FIG. 8 is a schematic front view (shown from an observer) explaining positional arrangement of each optical element and optical paths of the stereomicroscope according to the first embodiment of the present invention.

FIG. 1 is a side view showing a stereomicroscope according to a first embodiment of the present invention without attaching a camera. FIG. 2 is a side view showing a stereomicroscope according to the first embodiment of the present invention with attaching a camera. FIG. 3 is a view schematically showing an optical system of the stereomicroscope according to the first embodiment of the present invention. FIGS. 4A and 4B are views schematically showing variable space means equipped on the stereomicroscope according to the first embodiment of the present invention. FIG. 5 is a view schematically showing an optical system of the stereomicroscope according to a second embodiment of the present invention. FIG. 6 is a view schematically showing an optical system of the stereomicroscope according to a third embodiment of the present invention. FIGS. 7A and 7B respectively show a front view and a side view of the stereomicroscope according to the first embodiment of the present invention. FIG. 8 is a schematic front view (shown from an observer) explaining positional arrangement of each optical element and optical paths of the stereomicroscope according to the first embodiment of the present invention.

First Embodiment

In FIG. 1, a stereomicroscope A is composed of a base 1, a column 3 which is connected to the base 1, a pair of eyepieces 5, 5, a pair of eyepiece tubes 7, 7 each having the eyepiece 5, a microscope body 9 equipped with the eyepiece tubes 7, 7 and a photographing optical system which is explained later, a support means 11 which is arranged to the column 3 and removably supports an imaging means, which is explained later, for imaging a sample, a connecting means 13 that rotatably connects the microscope body 9 to the column 3, and a focusing handle 15 that focuses on the sample (not shown) by moving the microscope body 9 up and down.

The stereomicroscope A makes it possible to accomplish compactness upon being carried such that the eyepiece tubes 7, 7 can be stored in a space between the base 1 and the microscope body 9 by rotating the microscope body 9 around an axis perpendicular to the column 3 by about 180 degrees.

As shown in FIG. 2, when an imaging means 17 (for example, a camera or the like, hereinafter shown by "a camera") is attached through the support means 11 arranged to the column 3, since the microscope body 9 and the camera 17 are positioned left and right while the column 3 serves as an axis (see left and right in FIG. 2), center of gravity does not move upward and the balance between left and right is good, so that the configuration can secure stability of the stereomicroscope A. Incidentally, when the camera 17 is attached, in order to secure further stability, the base 1 is equipped with a variable space means 40 or 50, which is retractable and explained later.

Next, an optical system of the stereomicroscope A according to the first embodiment of the present invention is explained with reference to FIG. 3.

In FIG. 3, the light come out from a sample (not shown) placed on the base 1 is erected by a pair of erect prisms 23, 23 disposed in a pair of eyepiece tubes 7, 7 through a pair of observation objective lenses 20, 20 and forms erected sample images on the focal planes 23a, 23a. Then, enlarged images enlarged by a pair of eyepieces 5, 5 are observed by an observer.

On the other hand, the light come out from the sample is deflected substantially perpendicularly by a roof prism 26 which is a reflection member, through a photographing objective lens 25, relayed by a relay lens 27, incident on the camera 17 through the connecting means 13, the column 3, and the support means 11, and forms an image on an imaging device 28 (such as a CCD, hereinafter called "a CCD") to be photographed through a camera objective lens 29. The photographed image data is stored in a memory (not shown).

As is apparent from FIG. 3, an optical axis I3 between the sample placed on the base 1 and the roof prism 26 for leading the sample image to the imaging means 17 is substantially perpendicular to the base on which the sample is placed. A pair of optical axes I1 and I2 of the observation optical system make a given angle with the optical axis I3 and the optical axes I1 and I2 are led to an observer side. The reason is not to overlap the roof prism 26 in the photographing optical system with the optical axis I1 or I2 of the observation optical system. Accordingly, although inclination of the image occurs in the observation optical system, it can be made inconspicuous by a correction that the observation objective lenses 20, 20 are inclined with respect to respective optical axes I1 and I2. However, the radial directions of the observation objective lenses 20, 20 are inclined with the optical axis I3 of the photographing optical system, in other words, when the microscope is seen from a side, the optical axes I1, I2, and I3 are not on a common axis.

The roof prism 26 in the photographing optical system is disposed such that an optical path from the optical axis I3 is substantially perpendicularly deflected to the imaging means.

Moreover, since the focusing center of the observation optical system and that of the photographing optical system substantially correspond with each other, the observed image by the eyepieces 5, 5 and the photographed image by the camera 17 are substantially the same. Furthermore, since the focal planes 23a, 23a of the observation optical system and the CCD 28 are optically conjugate with respect to the sample, an in-focus sample point by the observation optical system can also be in-focus on the CCD 28.

FIG. 8 is a schematic front view (shown from an observer) explaining positional arrangement of each optical element and optical paths of the stereomicroscope according to the first embodiment of the present invention.

The left and right optical axes I1 and I2 of the observation optical system have different optical paths with each other and focusing is effected on a sample (not shown) placed on the base 1. On respective optical axes I1 and I2, a pair of objective lenses 20, 20 of the observation optical system are disposed. As shown in FIG. 8, each objective lens of the observation optical system is disposed such that radial direction of each objective lens becomes perpendicular to each optical axis of the observation optical system.

The light come out from the sample passes through each of the left and right objective lenses 20, 20 of the observation optical system, passes through each of the left and right erect prisms 23, 23, and is led to each of the left and right eyepiece lenses 5, 5.

Moreover, on the optical axis I3 of the photographing optical system, the light come out from the sample (not shown) is incident to a single objective lens 25 of the photographing optical system. As shown in FIG. 3 which is seen the stereomicroscope from the side, the optical axis I3 makes substantially perpendicularly to the sample (not shown). As shown in FIG. 8, the optical axis I3 comes to the center of the left and right optical axes I1 and I2 of the observation optical system. The light incident on the objective lens 25 of the photographing optical system is reflected by the roof prism 26 which is a reflection member, and led in the direction of the imaging means.

The microscope body 9 is rotatably connected to the column 3, which is supported by the base, through the connecting means 13. Accordingly, it becomes possible to observe a sample by rotating the microscope body 9 by any angle. Moreover, since the rotation axis o of the connecting means 13 substantially coincides with the optical axis I of the photographing optical system after the roof prism 26, even if a sample is observed with rotating the microscope body 9, the optical axis I of the photographing optical system does not slip out from the CCD 28 of the camera 17, so that an image almost same as the observed image can be photographed.

In this manner, since the stereomicroscope A according to the first embodiment of the present invention is constructed such that the camera 17 is arranged to the opposite side to the microscope body 9 with respect to the column 3, the center of gravity can be lower than that of the conventional trinocular eyepiece tube type, and weight distribution can be balanced with the column 3 as an axis, so that setting stability of the stereomicroscope A can be secured.

In order to stabilize the stereomicroscope A upon attaching a camera 17, the stereomicroscope A according to the first embodiment of the present invention has a variable space means 40 or 50 for expanding a setting area of the base 1 as shown in FIGS. 4A and 4B.

The variable space means 40 shown in FIG. 4A is composed of a couple of tube members 42, 42 each having substantially an "L" shape. Arm portions 42a, 42a of the tube members 42, 42 are connected respectively to the holes 40a, 40a formed inside a portion of the base 1 where the camera 17 is attached. As shown in FIG. 2, when the camera 17 is attached, the tube members 42, 42 are drawn out in the direction of attached camera (the lower half of FIG. 4A), so that setting stability of the stereomicroscope A can be increased by increasing the setting area of the base 1. On the other hand, when the camera 17 is not attached as shown in FIG. 1, the tube members 42, 42 are installed in the holes 40a, 40a of the base 1 as shown in upper half of FIG. 4A, so that setting area of the base can be minimum and the stereomicroscope A can be compact.

Another variable space means 50 shown in FIG. 4B is constructed by a couple of movable bases 51, 51 stored in the base 1 and rotatably held by a couple of shafts 52, 52. As shown in FIG. 2, when the camera 17 is attached, the movable bases 51, 51 are rotated and set in the direction of attached camera (the lower half of FIG. 4B), so that setting stability of the stereomicroscope A can be increased by increasing the setting area of the base 1. On the other hand, when the camera 17 is not attached as shown in FIG. 1, the movable bases 51, 51 are stored in the base 1 as shown in upper half of FIG. 4B, so that setting area of the base can be minimum and the stereomicroscope A can be compact. Incidentally, the movable bases 51, 51 may be suitably changed their setting position in accordance with rotation of the microscope body 9.

In this manner, the stereomicroscope A according to the first embodiment of the present invention makes it possible to increase setting stability of the stereomicroscope A by increasing the area of the base by means of the variable space means upon attaching the camera 17. When the camera 17 is not attached, the variable space means can be stored in the base 1, so that setting area of the base can be minimum and the stereomicroscope A can be compact to increase portability. Incidentally, in order not to spoil weight saving of the stereomicroscope A, tube members 42, 42 and movable bases 51, 51 are made of light material such as aluminum, reinforced plastic, or the like.

The stereomicroscope A according to the first embodiment of the present invention has a focusing mechanism for focusing on the sample. Focusing is carried out by vertically (up and down) moving the microscope body 9 by means of a vertically (up and down) moving mechanism stored in the column 3. As shown in FIGS. 7A and 7B, the vertically moving mechanism is composed of a rack support 70 arranged along the vertical direction (Z direction which is parallel to the optical axis of the photographing objective lens 25) of the column 3, a focusing handle 15, a shaft 72 of the focusing handle 15, a pinion 71 which is formed on the shaft 72 where the pinion 71 makes contact with the rack support 70, and a guide 73 which is formed inner wall of the column 3 and guides the column 3 along the vertical direction (Z direction). The guide 73 is for preventing the column 3 from being disengaged from the rack support 70 upon vertically moving the column 3 along the rack support 70 in accordance with rotation of the focusing handle 15. The guide 73 is movably attached to the rack support 70. The microscope body 9 moves in a body with the column 3 along the rack support 70. The optical path in the column 3 connecting the microscope body 9 and the support means 11 is secured by a connecting member 74. The connecting member 74 is preferably a closed, tubular structure for preventing ambient light from getting in.

In positional relation between the connecting member 74 and the rack support 70, in order not to collide the rack support 70 with the connecting member 74 in accordance with vertical movement of the microscope body 9 upon focusing, the moving range in Z direction of the microscope body 9 is limited.

In the first embodiment, although focusing is manually carried out, the microscope body 9 may be electrically moved in Z direction.

Second Embodiment

A stereomicroscope B according to a second embodiment of the present invention is explained below with reference to FIG. 5. The second embodiment increases stability of the stereomicroscope by making a camera connecting position closer to the base with respect to the first embodiment. Accordingly, the similar construction to the first embodiment is attached with the same reference number, and further explanation is omitted.

In FIG. 5, a stereomicroscope B is constructed such that a support means 11 for supporting a camera 17 is disposed on a column 3 close to a base 1, and in order to lead an optical axis I of a photographing optical system to an optical axis IC of the camera 17, optical path deflection members 31, 32 (such as mirrors, prisms, or the likes) are disposed in the column 3. Similar to the first embodiment, the optical axis I of the photographing optical system substantially coincides with a rotational axis O of a connecting means 13, and a variable space means 40 or 50 is stored in the base 1.

With this construction, the light come out from a sample passes along the optical axes I3, I, I4, and IC, and is photographed by the camera 17. Since the position where the camera 17 is attached is close to the base 1, the center of gravity is located lower position, so that setting stability of the stereomicroscope B is further increased.

In the stereomicroscope B according to the second embodiment of the present invention, the microscope body 9 can also be vertically (up and down) moved along Z direction of the column 3 upon focusing. A vertical (up and down) movement mechanism is the same as explained with reference to FIGS. 7A and 7B. However, optical path deflection members 31, 32 are installed in the column 3 of the stereomicroscope B according to the second embodiment. In accordance with the vertical movement of the microscope body 9 upon focusing, the optical path deflection members 31, 32 also vertically (up and down) move in a body with the microscope body 9.

The support means 11 is firmly attached to the column 3 in such manner that the light come out from the photographing objective lens 25 and passed through the optical path deflection members 31, 32 is precisely incident on the objective lens of the camera 17 supported by the support means 11. The support means 11 moves vertically (up and down) in a body in accordance with the movement of the column 3 and the microscope body 9.

In order not to collide the rack support 70 with the optical path deflection members 31, 32 in accordance with vertical movement of the microscope body 9 upon focusing, the moving range in Z direction of the microscope body 9 is limited on the rack support 70. The other constructions, functions, and effects are the same as the first embodiment, so further explanation is omitted.

Third Embodiment

Then, a stereomicroscope C according to a third embodiment of the present invention is explained below with reference to FIG. 6. The third embodiment increases operability of the stereomicroscope C upon photographing by arranging a camera connecting position opposite to the column side with respect to the microscope body, so that the same reference numbers are attached to the similar elements in the first embodiment and further explanation is omitted.

In FIG. 6, a support means 11 of a camera 17 is disposed on the opposite side to a column 3 with respect to a microscope body 9. Moreover, an optical axis I of a photographing optical system and an optical axis IC of the camera 17 substantially coincide with each other, and substantially parallel to a rotation axis O of a connecting means 13. A base 1 stores a variable space means 40 or 50.

With this configuration, it becomes possible to photograph with watching a display 17a (such as an LCD) arranged on the rear side of the camera 17 upon photographing. Moreover, since the microscope body 9 and the camera 17 are configured in a body, it becomes possible to increase rigidity mainly around the rotation axis of the stereomicroscope C. The other constructions, functions, and effects are the same as the first embodiment, so that further explanation is omitted.

As explained above, the stereomicroscope according to the present invention can be used as a conventional portable compact lightweight stereomicroscope upon attaching no camera. On the other hand, upon attaching a camera, the stereomicroscope makes it possible to relatively lower the center of gravity, to make variation in the center of gravity smaller to increase stability upon rotating the microscope body, and to prevent the microscope body from being stumbled upon observing. Moreover, since a variable space means for further increasing stability upon attaching a camera is stored in the base, a setting area in the direction of the attached camera can be expanded so as to prevent the microscope body from being stumbled. Furthermore, since the support means capable of removably holding a camera is disposed, when the stereomicroscope is carried outdoors with a camera (such as a digital camera, or the like) available on the market, a sample can be photographed by attaching the camera to the microscope if necessary.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A stereomicroscope comprising:
    an eyepiece portion;
    a base;
    a column that is vertically disposed from the base, the column being coupled to a support member that extends vertically from the base so that the column is movable along a lengthwise direction of the support member;
    a microscope body that is attached to the eyepiece portion, is supported rotatably on an observer side of the column, has a rotation axis substantially perpendicular to the column and extending toward the observer, and is capable of being rotated, in the entirety of the microscope body, around the rotation axis selectively between an observation position and a storing position;
    a support device that supports an imaging device and is supported on the opposite side of the column and the support member from the observer; and
    a tubular connecting member extending through an interior of the column between the microscope body and the support device, the connecting member being movable with the column and positioned in an upper portion of the column such that in a lowest position of the column relative to the base, the connecting member is positioned above the support member;
    the microscope body including an imaging optical system and a roof prism so that light from a sample is reflected by the roof prism substantially perpendicularly and led through the imaging optical system to the imaging device, an optical axis of the imaging optical system being substantially coaxial with the rotation axis and extending in a direction away from the observer, the optical axis further extending across the column and the support member through the connecting member.

2. The stereomicroscope according to claim 1, wherein the microscope body further includes an objective lens between the sample and the roof prism, so that light from the sample passes through the objective lens and is incident on right and left roof portions of the roof prism.

3. The stereomicroscope according to claim 1, wherein the optical axis of the imaging optical system is also substantially coaxial with an optical axis of the imaging device.

4. The stereomicroscope according to claim 1, wherein the roof prism is disposed at a position where an optical axis of the light incident on the roof prism is substantially perpendicular to a plane of the base.

5. The stereomicroscope according to claim 1, wherein the microscope body and the support device are movable together along a lengthwise direction of the column.

6. A stereomicroscope comprising:
    an eyepiece portion;
    a base;
    a column that is vertically disposed from the base, the column being coupled to a support member that extends vertically from the base so that the column is movable along a lengthwise direction of the support member;
    a microscope body that is attached to the eyepiece portion, is supported rotatably on an observer side of the column, has a rotation axis substantially perpendicular to the column and extending toward the observer, and is capable of being rotated, in the entirety of the microscope body, around the rotation axis selectively between an observation position and a storing position;
    a support device that supports an imaging device and is supported on the opposite side of the column and the support member from the observer; and
    a tubular connecting member extending through an interior of the column between the microscope body and the support device, the connecting member being movable with the column and positioned in an upper portion of the column such that in a lowest position of the column relative to the base, the connecting member is positioned above the support member;
    the microscope body having an imaging optical system that includes an objective lens and a reflection member, such that light from a sample passes through the objective lens and is reflected by the reflection member substantially perpendicularly and led through the imaging optical system to the imaging device, an optical axis of the imaging optical system being substantially coaxial with the rotation axis and extending in a direction away from the observer, the optical axis further extending across the column and the support member through the connecting member;
    the microscope body further having an observation optical system that includes a pair of objective lenses through which light coming out from the sample is led to the eyepiece portion, the observation optical system having a pair of optical axes which are not coaxial with the optical axis of the light coming out from the sample and incident on the reflection member and which are inclined toward the observer; and
    the objective lenses of the observation optical system being inclined with respect to the respective optical axes of the observation optical system, thereby preventing inclination of an image of the sample caused by the pair of optical axes being inclined toward the observer.

7. The stereomicroscope according to claim 6, wherein the reflection member includes a roof prism, such that light from the sample is reflected by the roof prism substantially perpendicularly and led to the imaging device through the imaging optical system.

8. The stereomicroscope according to claim 6, wherein the microscope body and the support device are movable together along a lengthwise direction of the column.

9. A stereomicroscope comprising:
    an eyepiece portion;
    a base;
    a column that is vertically disposed from the base, the column being coupled to a support member that extends vertically from the base so that the column is movable along a lengthwise direction of the support member;
    a microscope body that is attached to the eyepiece portion, is supported rotatably on an observer side of the column, has a rotation axis substantially perpendicular to the column and extending toward the observer, and is capable of being rotated, in the entirety of the microscope body, around the rotation axis selectively between an observation position and a storing position;
    an image capturing device;
    a support device that supports the image capturing device and is supported on the opposite side of the column and the support member from the observer; and
    a tubular connecting member extending through an interior of the column between the microscope body and the support device, the connecting member being movable with the column and positioned in an upper portion of the column such that in a lowest position of the column relative to the base, the connecting member is positioned above the support member;

the microscope body including an imaging optical system and a roof prism so that light from a sample is reflected by the roof prism substantially perpendicularly and led through the imaging optical system to the imaging device, an optical axis of the imaging optical system being substantially coaxial with the rotation axis and extending in a direction away from the observer, the optical axis further extending across the column and the support member through the connecting member;

the image capturing device further comprising an imaging device with an incident surface positioned in alignment with and substantially perpendicular to the optical axis extending through the connecting member.

* * * * *